United States Patent
Osby

(10) Patent No.: US 10,442,878 B2
(45) Date of Patent: *Oct. 15, 2019

(54) ETHYLENE-BASED POLYMERS AND PROCESSES FOR THE SAME

(71) Applicant: Dow Global Technologies LLC, Midland, MI (US)

(72) Inventor: John O. Osby, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 232 days.

This patent is subject to a terminal disclaimer.

(21) Appl. No.: 14/411,445

(22) PCT Filed: Mar. 8, 2013

(86) PCT No.: PCT/US2013/029881
§ 371 (c)(1),
(2) Date: Dec. 26, 2014

(87) PCT Pub. No.: WO2014/003837
PCT Pub. Date: Jan. 3, 2014

(65) Prior Publication Data
US 2015/0197590 A1    Jul. 16, 2015

Related U.S. Application Data

(60) Provisional application No. 61/664,956, filed on Jun. 27, 2012.

(51) Int. Cl.
*C08F 210/02* (2006.01)
*C08L 23/08* (2006.01)
*C08F 236/20* (2006.01)

(52) U.S. Cl.
CPC .......... *C08F 210/02* (2013.01); *C08L 23/08* (2013.01); *C08L 23/0869* (2013.01); *C08F 236/20* (2013.01)

(58) Field of Classification Search
CPC ............ C08F 210/02; C08F 236/20; C08F 2220/281; C08F 2220/282; C08L 23/08; C08L 23/0846; C08L 23/0869
See application file for complete search history.

(56) References Cited

U.S. PATENT DOCUMENTS

| | | | |
|---|---|---|---|
| 3,264,275 A | | 8/1966 | Pattison et al. |
| 3,350,372 A | * | 10/1967 | Anspon ................... C08F 8/00 525/227 |
| 3,440,237 A | * | 4/1969 | Mottus ................ C08F 110/02 526/138 |
| 3,542,749 A | * | 11/1970 | Anspon .................... C08F 8/00 525/293 |
| 4,503,185 A | | 3/1985 | Hausman et al. |
| 5,539,075 A | | 7/1996 | Gustafsson et al. |
| 5,763,629 A | | 6/1998 | Fan et al. |
| 9,388,260 B2 | | 7/2016 | Osby et al. |
| 2003/0035917 A1 | * | 2/2003 | Hyman .................... B41M 1/30 428/67 |
| 2003/0212211 A1 | * | 11/2003 | Lenox ..................... C08L 15/00 525/222 |
| 2008/0242809 A1 | | 10/2008 | Neuteboom et al. |
| 2009/0253878 A1 | * | 10/2009 | Ye ......................... C08F 210/02 526/171 |
| 2011/0152454 A1 | * | 6/2011 | Devisme ................. B32B 27/32 525/53 |

FOREIGN PATENT DOCUMENTS

| | | | |
|---|---|---|---|
| GB | 1339511 | * | 12/1973 |
| GB | 1339511 A | | 12/1973 |
| JP | 2010120991 A | | 6/2010 |
| WO | 1997/045465 A1 | | 12/1997 |
| WO | 2007/110127 A1 | | 10/2007 |
| WO | 2012/057975 A1 | | 5/2012 |
| WO | 2012/084787 A1 | | 6/2012 |
| WO | 2013/059042 A1 | | 4/2013 |
| WO | 2013/078018 A2 | | 5/2013 |

OTHER PUBLICATIONS

Hong et al., Journal of Rheology 43 (1999) 781, abstract only.*
Tung, J. Polym. Sci., Polym. Chem. Ed., 1981, vol. 19, p. 2027-2039.
Tung, J. Polym. Sci., Polym. Chem. Ed., 1981, vol. 19, p. 3209-3217.
Liu, J. Polym. Sci. Part A: Polym. Chem., 2007, vol. 46, p. 1449-1459.
PCT/US2013/029881, May 10, 2013, International Search Report and Written Opinion.
PCT/US2013/029881, Jan. 8, 2015, International Preliminary Report on Patentability.

* cited by examiner

*Primary Examiner* — Roberto Rabago
(74) *Attorney, Agent, or Firm* — Husch Blackwell LLP

(57) ABSTRACT

The invention provides an ethylene-based polymer formed from reacting at least the following: ethylene and at least one asymmetrical polyene, comprising an "alpha, beta unsaturated end" and a "C—C double bond end," and wherein the reaction takes place in the presence of at least one free-radical initiator.

11 Claims, No Drawings

ETHYLENE-BASED POLYMERS AND PROCESSES FOR THE SAME

REFERENCE TO RELATED APPLICATIONS

The present application claims the benefit of U.S. Provisional Application No. 61/664,956, filed Jun. 27, 2012.

BACKGROUND

Conventional low density polyethylene (LDPE) has good processability, however, when used in film application, increased melt strength is still desired.

U.S. Publication No. 2008/0242809 discloses a process for the preparation of a copolymer of ethylene and a comonomer, and where the polymerization takes place in a tubular reactor, at a peak temperature between 290° C. and 350° C. The comonomer is a di- or higher functional (meth)acrylate, and the co monomer is used in an amount between 0.008 mole percent and 0.200 mole percent, relative to the amount of ethylene copolymer.

International Publication No. WO 2007/110127 discloses an extrusion coating composition comprising an ethylene copolymer. The ethylene copolymer is obtained by a polymerization process in a tubular reactor, at a peak temperature between 300° C. and 350° C., and the comonomer is a bifunctional α,ω-alkadiene.

U.S. Pat. No. 5,539,075 discloses the polymerization of ethylene and at least one monomer, which is copolymerizable with ethylene, and includes a polyunsaturated comonomer having a chain of at least eight carbon atoms and at least two non-conjugated double bonds, of which at least one is terminal. The polymerization takes place at a pressure of about 100-300 MPa, and a temperature of about 80°–300° C., under the action of a radical initiator. The polyunsaturated comonomer preferably is an α,ω-alkadiene having 8-16 carbon atoms, and most preferred 1,9-decadiene. Apart from the polyunsaturated comonomer, the polymerization may also involve another vinyl-unsaturated monomer, preferably containing at least one functional group selected from hydroxyl groups, alkoxy groups, carbonyl groups, carboxyl groups and ester groups. The ethylene copolymers produced have an increased degree of unsaturation, which can be used for cross-linking the ethylene copolymer or grafting reactive groups.

International Publication No. WO 97/45465 discloses an unsaturated ethylene copolymer, a method for producing it, and its use for producing cross-linked structures. The unsaturated ethylene copolymer comprises a polymer obtained by radical polymerization, through a high-pressure process of ethylene and at least one monomer, which is copolymerizable with ethylene, and includes a diunsaturated comonomer of the formula (I): H2C=CH—O—R—CH=CH2, wherein R=—(CH2)m-O—, —(CH2CH2O)n-, or —CH2-C6H10-C H2-O—, m=2-10, and n=1-5. Preferably, the comonomer of formula (I) is 1,4-butanediol divinyl ether.

Tung, L. H., et al., *Preparation of Polystyrene with Long Chain Branches via Free Radical Polymerization*, J. Polym. Sci., Polym. Chem. Ed., (1981), 19, 2027-39, discloses the use of small amounts of chain-transferring monomers to copolymerize with styrene, free-radically. Of the comonomers examined, vinylbenzylthiol, yielded polystyrene with a branched structure. The branches are disclosed as occurring mainly in the low molecular weight end of the distribution. Vinylbenzylthiol was also found to be an effective agent for the broadening of the molecular weight distribution.

Tung, L. H., *Branching Kinetics in Copolymerization of Styrene with a Chain-Transfer Monomer*, J. Polym. Sci., Polym. Chem. Ed., (1981), 19, 3209-3217, discloses the use of polymerization kinetics to compute the theoretical molecular weight and degree of branching, for the polymerization with styrene with a chain transfer monomer (for example, vinylbenzylthiol).

Liu, J., et al., *Branched Polymer via Free Radical Polymerization of Chain Transfer Monomer: A Theoretical and Experimental Investigation*, J. Polym. Sci. Part A: Polym. Chem., (2007), 46, 1449-59, discloses a mathematical model for the free radical polymerization of chain transfer monomers, containing both polymerizable vinyl groups and telogen groups. The molecular architecture of the polymer is disclosed as being prognosticated according to the developed model, which was validated experimentally by the homopolymerization of 4-vinyl benzyl thiol (VBT), and its copolymerization with styrene.

U.S. Pat. No. 3,542,749 discloses ethylene copolymers that contain polymerized ethylene and polymerized oleyl acrylate, erucyl acrylate, N-oleyl acrylamide, Nerucyl acrylamide or any mixture thereof. Such copolymers, and blends of such copolymers with ethylene homopolymers, are disclosed as exhibiting a low coefficient of friction and good antiblocking properties, when formed into films U.S. Patent Publication 2009/0253878 discloses a polyolefin polymer comprising one or more terminal polymerizable methacryloyl groups, and a process for preparing the same. The polymer is prepared by a one-pot copolymerization reaction of an olefin, such as ethylene, and a heterobifunctional comonomer comprising a methacryloyl group, catalyzed by a late transition metal α-diimine catalyst, which is selectively non-reactive towards methacryloyl groups. The terminal methacryloyl groups within the polymer are reactive in further polymerization reactions. U.S. Pat. No. 5,763,629 discloses a process to prepare alkoxylated glycidyl (meth)acrylates. See also WO 2012/084787 for additional simulated reactions.

However, as discussed, there remains a need for ethylene-based polymers, such as low density polyethylene (LDPE), with improved melt strength, especially for film and extrusion coating applications. This needs and others have been met by the following invention.

SUMMARY OF THE INVENTION

The invention provides an ethylene-based polymer formed from reacting at least the following: ethylene and at least one asymmetrical polyene, comprising an "alpha, beta unsaturated end" and a "C—C double bond end," and wherein the reaction takes place in the presence of at least one free-radical initiator.

DETAILED DESCRIPTION

As discussed above, the invention provides an ethylene-based polymer formed from reacting at least the following: ethylene and at least one asymmetrical polyene, comprising an "alpha, beta unsaturated end" and a "C—C double bond end," and wherein the reaction takes place in the presence of at least one free-radical initiator.

The ethylene-based polymer may comprise a combination of two or more embodiments as described herein.

In one embodiment, the asymmetrical polyene is an asymmetrical diene.

In one embodiment, the "alpha, beta unsaturated end" of the asymmetrical polyene is selected from the group consisting of the following:

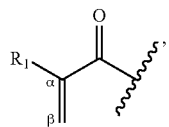
a)

wherein R1 is selected from H, or C1-C6 alkyl, further a C1-C3 alkyl and further $CH_3$;

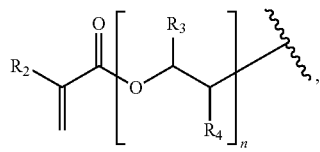
b)

wherein R2 is selected from H, or C1-C6 alkyl, further a C1-C3 alkyl and further $CH_3$; R3 is selected from H, $CH_3$, or $CH_2CH_3$; R4 is selected from H, $CH_3$, or $CH_2CH_3$; and n is from 1 to 50, further from 1 to 20 and further from 1 to 10; and wherein, when R3 is $CH_3$, or $CH_2CH_3$, then R4 is H; and when R4 is $CH_3$, or $CH_2CH_3$, then R3 is H;

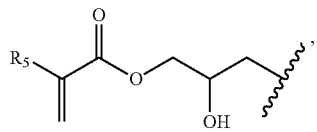
c)

wherein R5 is selected from H, or C1-C6 alkyl, further a C1-C3 alkyl and further $CH_3$; and

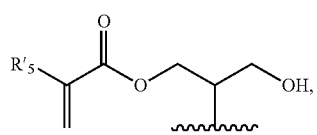
d)

wherein R'5 is selected from H, or C1-C6 alkyl, further a C1-C3 alkyl and further $CH_3$.

In the structures a) through d) above, the notation ∿∿ represents a break at the center of a covalent bond between the "alpha, beta unsaturated end" of the asymmetrical polyene and the remaining chemical structure of the asymmetrical polyene.

In one embodiment, the "C—C double bond end" of the asymmetrical polyene is selected from the group consisting of the following:

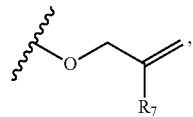
1)

wherein R7 is selected from H, or C1-C6 alkyl, further a C1-C3 alkyl and further $CH_3$;

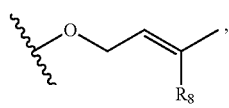
2)

wherein R8 is selected from H, or C1-C6 alkyl, further a C1-C3 alkyl and further $CH_3$;

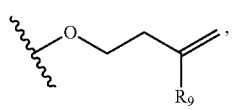
3)

wherein R9 is selected from H, or C1-C6 alkyl, further a C1-C3 alkyl and further $CH_3$;

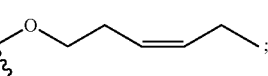
4)

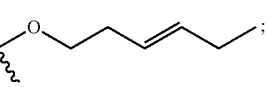
5)

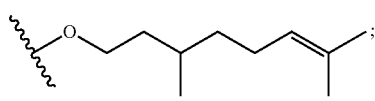
6)

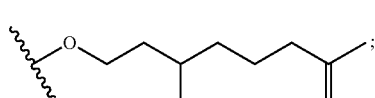
7)

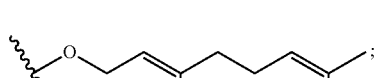
8)

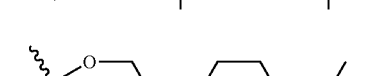
9)

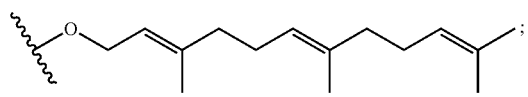
10)

11) 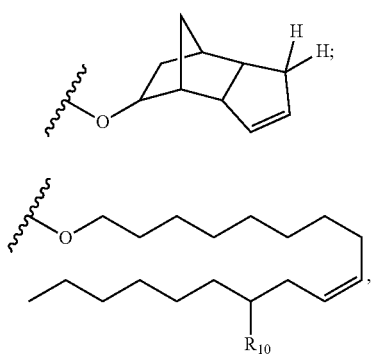

wherein R10 is selected from H, or OH;

12) 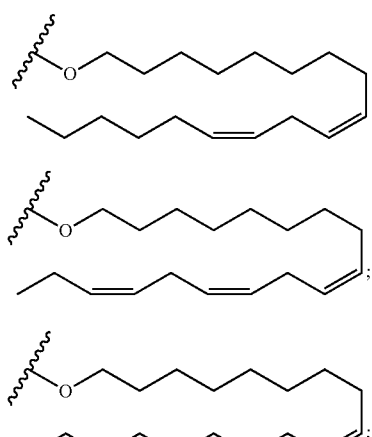

13)

14)

15)

16)

17) 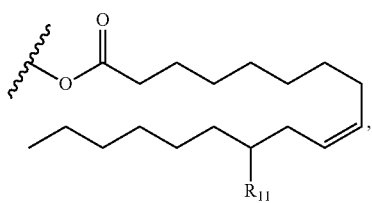

wherein R11 is selected from H, or OH;

18) 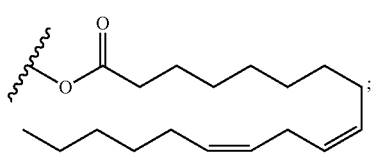

19) 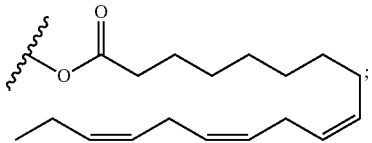

20) 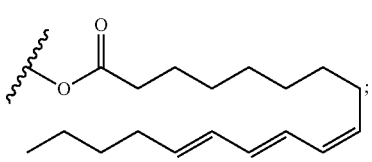

21) 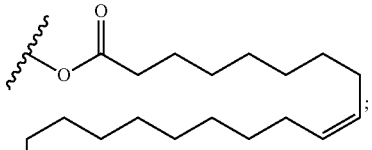

22) 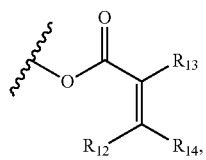

wherein R12 is selected from H, or C1-C6 alkyl, further a C1-C3 alkyl and further CH$_3$; R13 is selected from H, or C1-C6 alkyl, further a C1-C3 alkyl and further CH$_3$; and R14 is selected from H, or C1-C6 alkyl, further a C1-C3 alkyl and further CH$_3$, or Ph; and 23) 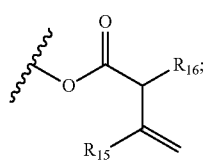

wherein R15 is selected from H, or C1-C6 alkyl, further a C1-C3 alkyl and further CH$_3$; R16 is selected from H, or C1-C6 alkyl, further a C1-C3 alkyl and further CH$_3$.

In the structures 1) through 23) above, the notation ∼∼ represents a break at the center of a covalent bond between the "C—C double bond end" of the asymmetrical polyene and the remaining chemical structure of the asymmetrical polyene.

In one embodiment, the "C—C double bond end" of the asymmetrical polyene is selected from the group consisting of the following:

1) 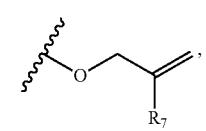

wherein R7 is selected from H, or C1-C6 alkyl, further a C1-C3 alkyl and further CH$_3$;

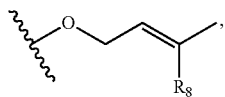
2)

wherein R8 is selected from H, or C1-C6 alkyl, further a C1-C3 alkyl and further CH₃;

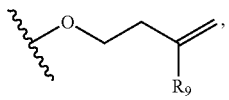
3)

wherein R9 is selected from H, or C1-C6 alkyl, further a C1-C3 alkyl and further CH₃;

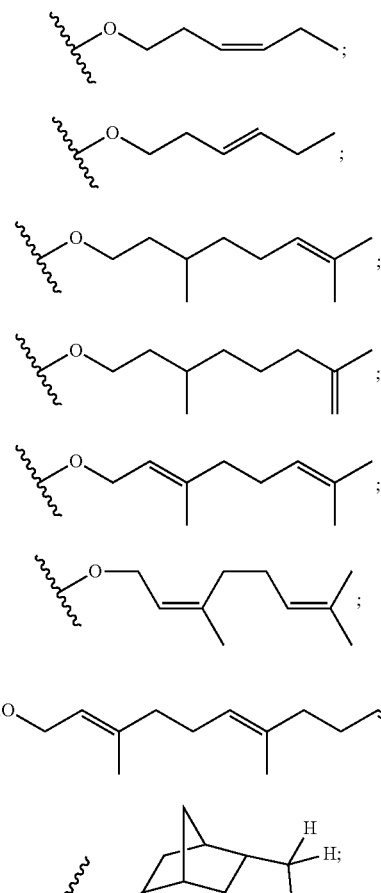
4)
5)
6)
7)
8)
9)
10)
11)

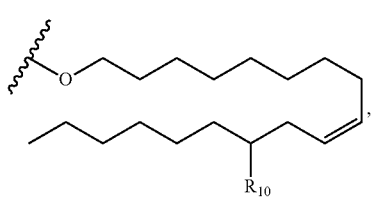
12)

wherein R10 is selected from H, or OH;

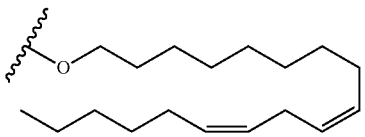
13)

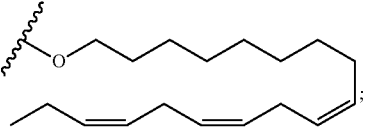
14)

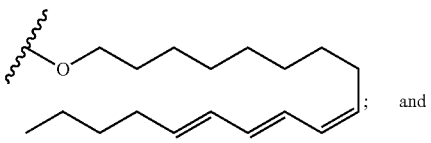
15)

and

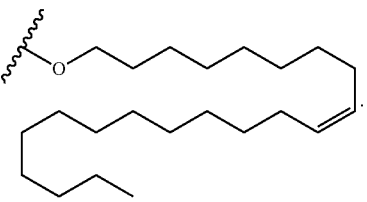
16)

In one embodiment, the "C—C double bond end" of the asymmetrical polyene is selected from the group consisting of the following: 1), 2), 3), 4), 5), 6), 7), 8), 9), 10), 11) and 12), each as shown above.

In one embodiment, the "C—C double bond end" of the asymmetrical polyene is selected from the group consisting of the following: 1), 2), 3) and 12), each as shown above.

In one embodiment, the "C—C double bond end" of the asymmetrical polyene is selected from the group consisting of the following: 13), 14), 15) and 16), each as shown above.

In one embodiment, the "alpha, beta unsaturated end" of the asymmetrical polyene is selected from the group consisting of the following:

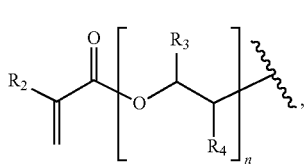
b)

wherein R2 is selected from H, or C1-C6 alkyl, further a C1-C3 alkyl and further CH₃; R3 is selected from H, CH₃, or CH₂CH₃; R4 is selected from H, CH₃, or CH₂CH₃; and n is from 1 to 50, further from 1 to 20 and further from 1 to 10; and wherein, when R3 is CH₃, or CH₂CH₃, then R4 is H; and when R4 is CH₃, or CH₂CH₃, then R3 is H; and

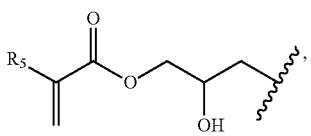
c)

wherein R5 is selected from H, or C1-C6 alkyl, further a C1-C3 alkyl and further CH$_3$.

In one embodiment, the "alpha, beta unsaturated end" of the asymmetrical polyene is selected from the group consisting of the following:

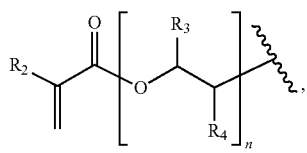
b)

wherein R2 is selected from H, or C1-C6 alkyl, further a C1-C3 alkyl and further CH$_3$; R3 is selected from H, CH$_3$, or CH$_2$CH$_3$; R4 is selected from H, CH$_3$, or CH$_2$CH$_3$; and n is from 1 to 50, further from 1 to 20 and further from 1 to 10; and wherein, when R3 is CH$_3$, or CH$_2$CH$_3$, then R4 is H; and when R4 is CH$_3$, or CH$_2$CH$_3$, then R3 is H.

In one embodiment, the "alpha, beta unsaturated end" of the asymmetrical polyene is selected from the group consisting of the following:

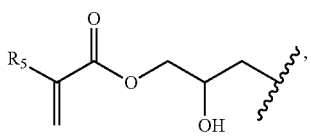
c)

wherein R5 is selected from H, or C1-C6 alkyl, further a C1-C3 alkyl and further CH$_3$.

In one embodiment, the asymmetrical polyene is present in an amount greater than, or equal to, 100 ppm, based on the total amount of ethylene in the reactor.

In one embodiment, the asymmetrical polyene is selected from the group consisting of the following:

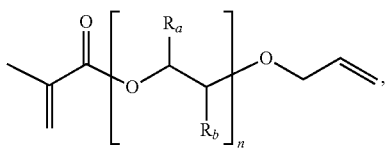
i)

wherein n is from 1 to 50, further from 1 to 20 and further from 1 to 10; R$_a$ is selected from H or methyl; R$_b$ is selected from H or methyl; and when R$_a$ is methyl, then R$_b$ is hydrogen; and when R$_a$ hydrogen, then R$_b$ is methyl;

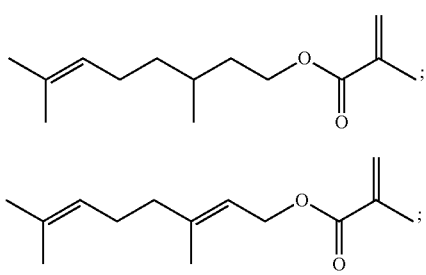
ii)

iii)

-continued

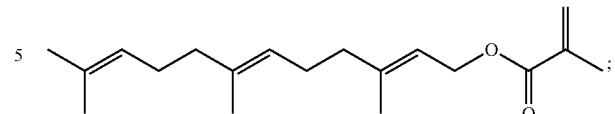
iv)

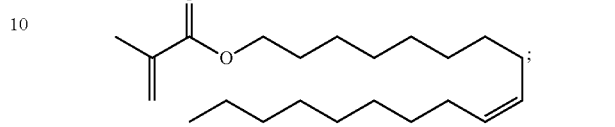
v)

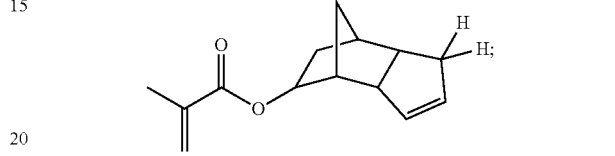
vi)

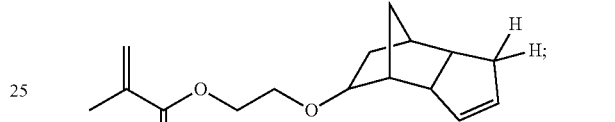
vii)

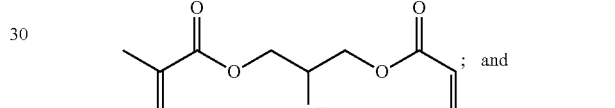
viii) ; and

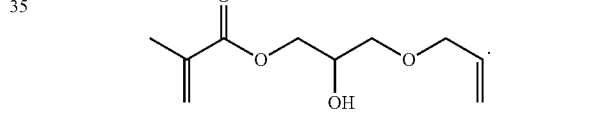
ix)

In one embodiment, the asymmetrical polyene is selected from the group consisting of the following: i), ii), iii), iv) and v), each as shown above.

In one embodiment, the asymmetrical polyene is selected from the group consisting of the following: i) and v), each as shown above.

In one embodiment, the asymmetrical polyene is selected from the group consisting of the following: vi), vii), viii) and ix), each as shown above.

In one embodiment, the asymmetrical diene has $^1$H NMR signals from 3.0 to 6.5 ppm chemical shift.

In one embodiment, an inventive polymer is polymerized in the presence of at least two asymmetrical polyenes, and further two asymmetrical dienes, as disclosed herein.

An asymmetrical polyene may comprise a combination of two or more embodiments as described herein.

An asymmetrical diene may comprise a combination of two or more embodiments as described herein.

In one embodiment, the ethylene-based polymer is a low density polyethylene (LDPE).

In one embodiment, the ethylene-based polymer comprises at least one structure selected from the group consisting of the following A through D:

A)

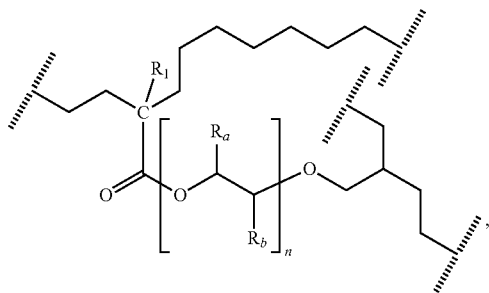

wherein n is from 1 to 50; R1 is selected from H or C1-C6 alkyl; $R_a$ is selected from H or methyl; $R_b$ is selected from H or methyl; and when $R_a$ is methyl, then $R_b$ is hydrogen; and when $R_a$ hydrogen, then $R_b$ is methyl;

B)

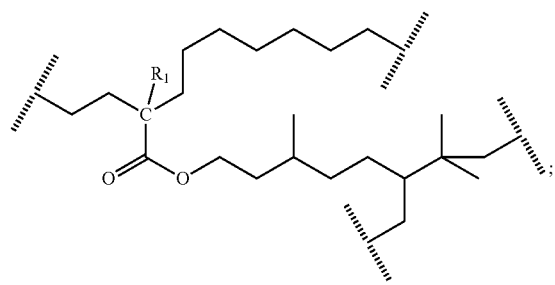

wherein R1 is selected from H or C1-C6 alkyl;

C)

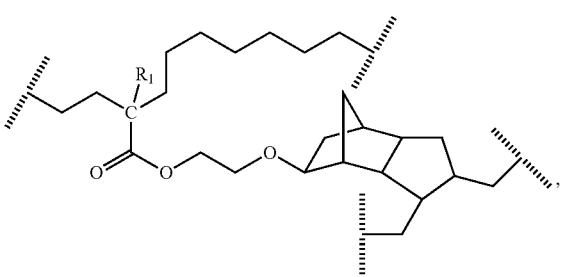

wherein R1 is selected from H or C1-C6 alkyl; and

D)

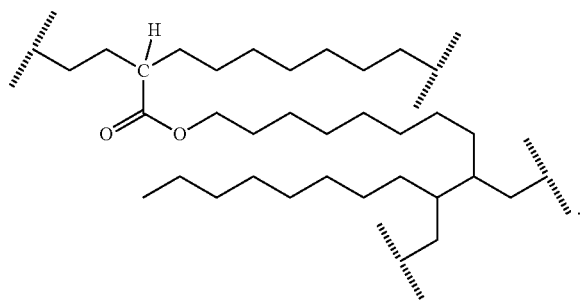

In one embodiment, the ethylene-based polymer comprises at least one structure selected from structures A through C, as shown above.

In one embodiment, the ethylene-based polymer comprises at least one structure selected from structures A or B, as shown above.

In one embodiment, the ethylene-based polymer comprises at least one structure selected from structures A, as shown above.

In one embodiment, the ethylene-based polymer comprises at least one structure selected from structures B, as shown above.

In one embodiment, the ethylene-based polymer comprises at least one structure selected from structures C, as shown above.

In one embodiment, the ethylene-based polymer comprises at least one structure selected from structure D, as shown above.

In the above structures A through D, the notation " ⅠⅠⅠⅠⅠⅠⅠⅠ " represents a break at the center of a covalent carbon-carbon bond in the hydrocarbon backbone of the ethylene-based polymer.

In one embodiment, the ethylene-based polymer comprises, in reacted form, greater than, or equal to, 0.075 moles of the asymmetrical polyene per 1000 moles of ethylene-based polymer backbone carbons, based on the weight of the polymer. In a further embodiment, the asymmetrical polyene is an asymmetrical diene.

In one embodiment, the ethylene-based polymer comprises, in reacted form, less than, or equal to, 10 moles asymmetrical polyene per 1000 moles of ethylene-based polymer back bone carbons, based on the weight of the polymer. In a further embodiment, the asymmetrical polyene is an asymmetrical diene.

In one embodiment, the ethylene-based polymer comprises, in reacted form, less than, or equal to, 5 moles asymmetrical polyene per 1000 moles of ethylene-based polymer back bone carbons, based on the weight of the polymer. In a further embodiment, the asymmetrical polyene is an asymmetrical diene.

In one embodiment, the ethylene-based polymer comprises, in reacted form, at least 0.03 weight percent of the asymmetrical polyene, based on the weight of the polymer. In a further embodiment, the asymmetrical polyene is an asymmetrical diene.

In one embodiment, the ethylene-based polymer has a melt index ($I_2$) from 0.3 to 100 g/10 min, or from 1 to 50 g/10 min, or from 2 to 20 g/10 min.

In one embodiment the ethylene-based polymer has a density greater than, or equal to, 0.900, or greater than, or equal to, 0.905, or greater than, or equal to, 0.910, grams per cubic centimeter (g/cc or g/cm$^3$).

In one embodiment the ethylene-based polymer has a density less than, or equal to, 0.950, or less than, or equal to, 0.945, or less than, or equal to, 0.940, grams per cubic centimeter (g/cc or g/cm$^3$).

In one embodiment the ethylene-based polymer has a density from 0.900 to 0.950, or from 0.905 to 0.945, or from 0.910 to 0.940, g/cc.

The invention also provides a composition comprising an inventive ethylene-based polymer, as described herein.

In one embodiment, the composition further comprises an ethylene/α-olefin interpolymer with a density less than, or equal to, 0.94 g/cc.

In one embodiment, the composition further comprises another ethylene-based polymer that differs from the inventive ethylene-based polymer in one or more properties, for example, density, melt index (I2), Mw, Mn or Mw/Mn.

The invention also provides an article comprising at least one component formed from an inventive composition.

In one embodiment, the article is a film or a coating.
In one embodiment, the article is a film.
In one embodiment, the article is a coating.

An inventive ethylene-based polymer may comprise a combination of two or more embodiments as described herein.

An inventive composition may comprise a combination of two or more embodiments as described herein.

An inventive article may comprise a combination of two or more embodiments as described herein.

The invention also provides a process to form an inventive ethylene-based polymer, as described herein, the process comprising polymerizing ethylene in the presence of the asymmetrical polyene comprising an "alpha, beta unsaturated end" and a "C—C double bond end. In a further embodiment, the asymmetrical polyene is an asymmetrical diene.

In one embodiment, the ethylene is polymerized in the presence of at least 50 mole ppm (based on amount of total monomers in reaction feed) of the asymmetrical polyene. In a further embodiment, the asymmetrical polyene is an asymmetrical diene.

In one embodiment, the process takes place in a reactor configuration comprising at least one tubular reactor.

In one embodiment, the polymerization pressure is greater than, or equal to, 100 MPa. In a further embodiment, the polymerization takes place at least one pressure from 150 MPa to 350 MPa. In a further embodiment, the polymerization takes place at least one temperature from 100° C. to 380° C. In a further embodiment, the process takes place in a reactor configuration comprising at least one tubular reactor.

In one embodiment, the polymerization takes place in at least one tubular reactor or at least one autoclave.

In one embodiment, the polymerization takes place in at least one autoclave.

In one embodiment, the polymerization takes place in at least one tubular reactor.

In one embodiment, the asymmetrical diene is added to the polymerization in an amount from 0.002 to 0.300 mole percent, further from 0.005 to 0.300 mole percent, based on the total moles of ethylene and asymmetrical diene added to the polymerization. In a further embodiment, the polymerization takes place in two reactors. In another embodiment, the polymerization takes place in one reactor.

An inventive process may comprise a combination of two or more embodiments as described herein.

Process

For producing a highly branched ethylene-based polymer, a high pressure, free-radical initiated polymerization process is typically used. Two different high pressure free-radical initiated polymerization process types are known. In the first type, an agitated autoclave vessel having one or more reaction zones is used. The autoclave reactor normally has several injection points for initiator or monomer feeds, or both. In the second type, a jacketed tube is used as a reactor, which has one or more reaction zones. Suitable, but not limiting, reactor lengths may be from 100 to 3000 meters (m), or from 1000 to 2000 meters. The beginning of a reaction zone, for either type of reactor, is typically defined by the side injection of either initiator of the reaction, ethylene, chain transfer agent (or telomer), comonomer(s), as well as any combination thereof. A high pressure process can be carried out in autoclave or tubular reactors having one or more reaction zones, or in a combination of autoclave and tubular reactors, each comprising one or more reaction zones.

In one embodiment an initiator is injected prior to the reaction zone where free radical polymerization is to be induced.

Often a conventional chain transfer agent is used to control molecular weight. In a preferred embodiment, one or more conventional chain transfer agents (CTAs) are added to an inventive polymerization process. Typical CTA that can be used include, but are not limited to, propylene, isobutane, n-butane, 1-butene, methyl ethyl ketone, acetone, ethyl acetate, propionaldehyde, ISOPAR (ExxonMobil Chemical Co.), and isopropanol. In one embodiment, the amount of CTA used in the process is from 0.03 to 10 weight percent of the total reaction mixture.

In one embodiment, the process includes a process recycle loop to improve conversion efficiency.

In one embodiment, the polymerization may take place in a tubular reactor as described in international patent application PCT/US12/059469, filed Oct. 10, 2012. This patent application describes a multi zone reactor which describes alternate locations of feeding fresh ethylene to control the ethylene to CTA ratio and therefore control polymer properties. Fresh ethylene may be simultaneously added in multiple locations to achieve the desired ethylene to chain transfer ratio. In a similar way addition of fresh CTA addition points may be carefully selected to control polymer properties as described in international patent application PCT/US12/064284 (filed Nov. 9, 2012). Fresh CTA may be simultaneously added in multiple locations to achieve the desired CTA to ethylene ratio. Likewise, the addition points and the amount of the fresh branching agents, described in this application, may be controlled to control gels formation while maximizing the desired property of increased melt strength and performance in targeted applications. Fresh branching agent may be simultaneously added in multiple locations to achieve the desired branching agent to ethylene ratio. The use of a branching and or coupling agent to broaden molecular weight distribution and to increase the melt strength of the polymer will put further requirements on the distribution of the CTA and the branching agent along a reactor system in order to achieve the desired change in product properties without or minimizing potential negative impacts like gel formation, reactor fouling, process instabilities, low efficiency of branching agent, etc.

In one embodiment, the polymerization takes place in at least one tubular reactor. In the multi reactor system, the autoclave reactor usually precedes the tubular reactor. The addition points and amounts of fresh ethylene, fresh CTA, and fresh branching agent may be appropriately controlled to achieve the desired ratios of CTA to ethylene and branching agent to ethylene in the feeds to and or in the reaction zones.

In one embodiment, the asymmetrical diene is added to the polymerization in an amount from 0.002 to 0.300 mole percent, further from 0.005 to 0.300 mole percent, based on the total moles of ethylene and asymmetrical diene added to the polymerization. In a further embodiment, the polymerization takes place in two reactors. In another embodiment, the polymerization takes place in one reactor with multiple or at least two reaction zones.

Ethylene used for the production of ethylene-based polymer may be purified ethylene, which is obtained by removing polar components from a loop recycle stream, or by using a reaction system configuration, such that only fresh ethylene is used for making the inventive polymer. It is not typical that purified ethylene is required to make ethylene-based polymer. In such cases ethylene from the recycle loop may be used.

In one embodiment, the ethylene-based polymer comprises ethylene and one or more comonomers, and preferably one comonomer. Comonomers include, but are not limited to, α-olefins, acrylates, methacrylates and anhydrides, each typically having no more than 20 carbon atoms. The α-olefin comonomers may have 3 to 10 carbon atoms, or in the alternative, the α-olefin comonomers may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene.

In one embodiment, the ethylene-based polymer comprises ethylene and at least one asymmetrical polyene as the only monomeric units.

Initiators

Free radical initiators are generally used to produce the inventive ethylene-based polymers. Exemplary organic peroxides include, but are not limited to, cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. In one embodiment, these organic peroxy initiators are used in an amount from 0.001 to 0.2 weight percent, based upon the weight of polymerizable monomers.

In one embodiment, an initiator is added to at least one reaction zone of the polymerization, and wherein the initiator has a "half-life temperature at one second" greater than 255° C., preferably greater than 260° C. In a further embodiment, such initiators are used at a peak polymerization temperature from 320° C. to 350° C. In a further embodiment, the initiator comprises at least one peroxide group incorporated in a ring structure. Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10 percent of the combined weight of one or more additives, based on the weight of the inventive polymer.

In one embodiment the polymers of this invention are treated with one or more stabilizers, for example, antioxidants, such as IRGANOX 1010, IRGANOX 1076 and IRGAFOS 168. In general, the polymers are treated with one or more stabilizers before extrusion or other melt processes.

An inventive composition may further comprise at least one other polymer, in addition to an inventive ethylene-based polymer. Blends and mixtures of the inventive polymer with other polymers may be prepared. Suitable polymers for blending with the inventive polymers include natural and synthetic polymers. Exemplary polymers for blending include propylene-based polymers (both impact modifying polypropylene, isotactic polypropylene, atactic polypropylene, and random propylene/ethylene copolymers), various types of ethylene-based polymers, including high-pressure, free-radical LDPE, heterogeneously branched LLDPE (typically via Ziegler-Natta catalysis), homogeneously branched linear or substantially linear PE (typically via single-site, including metallocene catalysis), including multiple reactor PE ("in-reactor" compositions of heterogeneously branched PE and homogeneously branched PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Other ethylene-based polymers include homogeneous polymers, such as olefin plastomers and elastomers (for example, polymers available under the trade designations AFFINITY Plastomers and ENGAGE Elastomers (The Dow Chemical Company) and EXACT (ExxonMobil Chemical Co.)). Propylene-based copolymers (for example, polymers available under the trade designation VERSIFY Plastomers & Elastomers (The Dow Chemical Company) and VISTAMAXX (ExxonMobil Chemical Co.) can also be useful as components in blends comprising an inventive polymer.

Applications

The polymers of this invention may be employed in a variety of conventional thermoplastic fabrication processes to produce useful articles, including monolayer and multilayer films; molded articles, such as blow molded, injection molded, or rotomolded articles; coatings; fibers; and woven or non-woven fabrics.

An inventive polymer may be used in a variety of films, including but not limited to, clarity shrink films, collation shrink films, cast stretch films, silage films, stretch hood, sealants, and diaper backsheets.

Other suitable applications include, but are not limited to, wires and cables, gaskets and profiles, adhesives; footwear components, and auto interior parts.

DEFINITIONS

Unless stated to the contrary, implicit from the context, or customary in the art, all parts and percents are based on weight, and all test methods are current as of the filing date of this application.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding), or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below. Trace amounts of impurities may be incorporated into and/or within the polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, may comprise at least one comonomer.

The term "ethylene-based interpolymer" refers to an interpolymer that comprises a majority amount of polymerized ethylene, based on the weight of the interpolymer, and comprises at least one comonomer.

The term "ethylene-based copolymer" refers to an copolymer that comprises a majority amount of polymerized ethylene, based on the weight of the interpolymer, and a comonomer, as the only monomer types.

The term "propylene-based polymer" refers to a polymer that comprises a majority amount of polymerized propylene, based on the weight of the polymer, and, optionally, may comprise at least one comonomer.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

TEST METHODS

Density

Samples that were measured for density were prepared according to ASTM D 1928. Samples were pressed at 374° F. (190° C.), and 30,000 psi, for three minutes, and then at 70° F. (21° C.) and 30,000 psi for one minute. Density measurements were made within one hour of sample pressing, using ASTM D792, Method B.

Melt Index

Melt index, or I2, was measured in accordance by ASTM D 1238, Condition 190° C./2.16 kg, and was reported in grams eluted per 10 minutes. The I10 was measured in accordance with ASTM D 1238, Condition 190° C./10 kg, and was reported in grams eluted per 10 minutes.

Melt Strength

Melt strength was measured at 190° C. using a Göettfert Rheotens 71.97 (Göettfert Inc.; Rock Hill, S.C.). The melted sample (about 25 to 50 grams) was fed with a Göettfert Rheotester 2000 capillary rheometer, equipped with a flat entrance angle (180 degrees), and of length of 30 mm and diameter of 2 mm. The sample was fed into the barrel (L=300 mm, Diameter=12 mm), compressed, and allowed to melt for 10 minutes, before being extruded at a constant piston speed of 0.265 mm/s, which corresponds to a wall shear rate of 38.2 $s^{-1}$ at the given die diameter. The extrudate passed through the wheels of the Rheotens, located at 100 mm below the die exit, and was pulled by the wheels downward, at an acceleration rate of 2.4 $mm/s^2$. The force (in cN) exerted on the wheels was recorded as a function of the velocity of the wheels (in mm/s) Samples were repeated at least twice, until two curves of the force (in cN) as a function of strand velocity (in mm/s) superimpose, then the curve that had the highest velocity at the strand break was reported. Melt strength was reported as the plateau force (cN) before the strand broke.

Nuclear Magnetic Resonance ($^1$H NMR)

Each NMR sample was prepared by adding approximately "0.10 g of ethylene-based polymer" to "2.7 g of tetrachloroethane-$d_2$ (TCE), containing 0.001 M Cr(AcAc)$_3$ (tris(acetylacetonato)-chromium(III))" in a "NORELL 1001-7 10 mm NMR tube." The samples were purged by bubbling nitrogen through the solvent via a pipette, inserted into the tube for approximately five minutes, to prevent oxidation, and then they were capped, sealed with TEFLON tape, and then soaked at room temperature overnight to facilitate sample dissolution. The samples were kept in a nitrogen purge box during storage, before, and after, preparation to minimize exposure to oxygen. The samples were heated and mixed with a vortex mixer at 115° C. to ensure homogeneity. Each sample was visually inspected to ensure homogeneity.

The data were collected using a BRUKER AVANCE 400 MHz NMR Spectrometer, equipped with a BRUKER DUAL DUL high-temperature CRYOPROBE, at a sample temperature of 120° C. Each analysis was run with a ZG pulse, 32 scans, SWH 10,000 Hz, AQ 1.64s, and D1 14s. Acquisitions were repeated using a D1 of 28s to check quantitation, and results were equivalent.

EXPERIMENTAL

Inventive Ethylene-Based Polymers A-1, A-2 and A-3 (Different Amounts of Asymmetrical Diene) and Control A-0

Synthesis of Asymmetrical Diene Poly(Propylene Glycol) Allyl Ether Methacrylate.

All methacrylate monomers in this application were prepared in accordance with the method of example 1 in U.S. Pat. No. 4,916,255. In this case, UCON APPG-200, a polyglycol commercially available from The Dow Chemical Company was used to make the poly (propylene glycol) allyl ether methacrylate.

Asymmetrical Diene—

Undiluted poly (propylene glycol) allyl ether methacrylate (PPGAEM) was loaded into a 316 stainless steel supply vessel, and diluted with ethyl acetate, to produce a final concentration of 7.8 wt %. This vessel was purged with nitrogen for three hours before use and kept under 70 psig nitrogen pad during operation.

Initiators—

Peroxide initiator tert-butyl peroxyacetate (TPA, 20% by weight solution in ISOPAR H), and peroxide initiator di-tert-butyl peroxide (DTBP, 20% by weight solution in ISOPAR™ H), were combined with ISOPAR E, in a second 316 stainless steel supply vessel, to produce 1500 mass ppm TPA and 415 mass ppm DTBP (a ratio of 4:1 mole TPA/mole DTBP). The vessel was padded, de-padded, five times with 70 psig nitrogen before use, and kept under nitrogen pad during operation.

Control (A-0)—

Ethylene was injected at 5440 gm/hr (194 moles/hr), at a pressure of 1930 bar, into an agitated (1600 rpm) 300 mL high pressure CSTR reactor, with an external heating jacket set at 220° C. Propylene (chain transfer agent) was added to the ethylene stream, at a pressure of 62 bar, and at a rate of 177 gm/hr (4.2 mole/hr), before the mixture was compressed to 1930 bar, and injected into the reactor. The peroxide initiator mixture was added directly to the reactor through the sidewall of the CSTR reactor, and at a pressure of 1930 bar, and at a rate of $5 \times 10^{-2}$ gm/hr (0.4 millimoles/hr) of TPA and $1.4 \times 10^{-2}$ gm/hr (0.1 millimoles/hr) of DTBP. The ethylene conversion to polymer was 11.2 wt %, based on the mass of ethylene entering the reactor, and the average reaction temperature was 224° C. An ethylene-based polymer with a melt index (I2) of 3.89 g/10 min was formed. Approximately 650 grams of this ethylene-based polymer (A-0) was collected.

Inventive Ethylene-Based Polymers A-1, A-2 and A-3

Propylene (CTA) was added to the ethylene stream at a pressure of 62 bar, and at a rate of 163 gm/hr (3.9 mole/hr), before the mixture was compressed to 1930 bar, and injected into the reactor (see above). The solution of PPGAEM in ethyl acetate was pumped at a pressure of 1930 bar, and at a rate of 14.1 gm/hr (3.9 millimoles/hr) into the ethylene-propylene mixture, before said mixture was injected into the reactor. The peroxide initiator was added directly to the reactor, through the sidewall, at a pressure of 1930 bar, and at a rate of $5.5 \times 10^{-2}$ gm/hr (0.42 millimoles/hr) of TPA and $1.5 \times 10^{-2}$ gm/hr (0.1 millimoles/hr) of DTBP. The ethylene conversion to polymer was 9.2 wt %, based on the mass of ethylene entering the reactor, and the average reaction temperature was 228° C. An ethylene-based polymer with a melt index (I2) of 3.81 g/10 min was formed. Approximately 510 grams of this ethylene-based polymer (A-1) was collected. The PPGAEM amount was increased twice to form two more inventive polymers (A-2 and A-3). Reaction polymerization conditions are summarized below in Table 1. Properties of the polymers are shown in Table 2 below.

As shown in Table 2, the inventive polymers (A-1, A-2 and A-3) have significantly higher melt strength than the comparative control (A-0).

An ethylene-based polymer formed from a symmetrical diene, 1,4-butane diol dimethacrylate (BDDM-1), was compared with inventive examples A-2 and A-3. This comparative polymer was prepared under similar reaction conditions, as used for A-2 and A-3. Polymer data is presented in Table 3 below.

TABLE 3

Polymer Properties

| | Melt Index (I2) (g/10 min) | Melt Strength (cN) | Moles of diene Per 1000 Moles of Backbone Carbons* |
|---|---|---|---|
| BDDM-1 | 3.82 | 10.2 | 0.38 |
| A-2 | 3.74 | 9.4 | 0.28 |
| A-3 | 3.28 | 11.4 | 0.5 |
| A-2:A-3 Interpolation | NA | 10.3 | 0.38 |

*Determined by 1H NMR.

For each diene, one end is a methacrylate moiety. For the 1,4-butanediol dimethacrylate, the other end is a methacrylate. For PPGAEMA, the other end is an allyl ether. It has been unexpectedly discovered that inventive examples A-2 and A-3 have "melt strength increases" of about the same amount as the comparative ethylene-based polymer, prepared using 1,4-butanediol dimethacrylate. These results are unexpected, since it is know from published literature that the methacrylate moiety is much more reactive towards ethylene than the allyl moiety. For example, see Ehrlich and Mortimer in *Advances in Polymer Science*, vol. 7, pp. 432ff (1970), for the reactivity ratios. Thus, it is unexpected that the melt strength enhancement is almost the same for the two inventive polymers, on a molar basis, as compared to the comparative polymer.

TABLE 1

Polymerization Conditions

| | Ethylene (gm/hr) | Propylene (gm/hr) | t-butyl peroxy-acetate (gm/hr) | di-t-butyl peroxide (gm/hr) | 7.8 wt. % PPGAEM in Ethyl Acetate (gm/hr) | Reaction Temperature (° C.) | Ethylene Conversion (wt. %) | Ethylene-Based Polymer Collected (gm) |
|---|---|---|---|---|---|---|---|---|
| A-0 | 5440 | 177 | 0.050 | 0.014 | 0 | 224° C. | 11.2 | 650 |
| A-1 | 5440 | 163 | 0.055 | 0.015 | 14.1 | 228° C. | 9.2 | 510 |
| A-2 | 5440 | 174 | 0.063 | 0.018 | 26.9 | 222° C. | 9.2 | 500 |
| A-3 | 5440 | 180 | 0.059 | 0.016 | 41.0 | 225° C. | 11.5 | 660 |

TABLE 2

Polymer Properties

| | Melt Index (I2) (g/10 min) | Melt Strength (cN) | Moles of PPGAEM Per 1000 Moles of Backbone Carbons* |
|---|---|---|---|
| A-0 | 3.89 | 6.9 | 0 |
| A-1 | 3.81 | 7.8 | No Data |
| A-2 | 3.74 | 9.4 | 0.28 |
| A-3 | 3.28 | 11.4 | 0.5 |

*Determined by 1H NMR.

Inventive Ethylene-Based Polymers B-1, B-2 and B-3 and Control B-0

Asymmetrical Diene—

Undiluted dicyclopentenyloxyethyl methacrylate (hereafter DCPOEM; CAS [68586-19-6] The Dow Chemical Company) was loaded into a 0.25 L glass supply vessel, which was open to the atmosphere. Sufficient ethyl acetate was added to produce a 14.2 wt % solution of DCPOEM in ethyl acetate.

CTA—

A fresh 250 mL bottle of undiluted propionaldehyde (97%) was used as a supply vessel, which was open to the atmosphere.

Initiator—

The peroxide initiator tert-butyl peroxyacetate (2.3 grams of a 50% by weight solution in isododecane) was combined with 500 mL of n-heptane, and loaded into a third glass supply vessel. This solution was purged with nitrogen to minimize dissolved oxygen.

Control (B-0)—

Ethylene was injected at 1000 gm/hr (35.65 moles/hr), at a pressure of 2000 bar, into an agitated (2000 rpm) 54 mL high pressure CSTR reactor, with an external heating jacket set at 187° C. Next the propionaldehyde was degassed by an HPLC degasser, and then was added to the ethylene stream at a pressure of 250 bar, and at a rate of 3.23 gm/hr (56 millimoles/hr), before the mixture was compressed to 2000 bar. The peroxide initiator was added to the ethylene-propionaldehyde mixture at a pressure of 2000 bar, and at a rate of $2.5 \times 10^{-3}$ gm/hr (0.019 millimoles/hr), before the mixture entered the reactor. The ethylene conversion to polymer was 11 wt % based on the mass of ethylene entering the reactor, and the average reaction temperature was 219° C. An ethylene-based polymer having a melt index (I2) of 1.7 g/10 min was obtained. Approximately 50 grams of ethylene-based polymer was collected (Control B-0).

Inventive Ethylene-Based Polymers B-1, B-2 and B-3

DCPOEM solution was pumped at a pressure of 250 bar, and at a rate of 2.0 gm/hr (1.1 millimoles/hr) through an HPLC degasser, and then into the propionaldehyde stream, and mixed before said mixture was added to the ethylene stream and compressed to 2000 bar. The peroxide initiator was added to the "ethylene-propionaldehyde-DCPOEM" mixture at a pressure of 2000 bar, and at a rate of $2.9 \times 10^{-3}$ gm/hr (0.022 millimoles/hr), before the mixture entered the reactor. The ethylene conversion to polymer was 12 wt % based on the mass of ethylene entering the reactor, and the average reaction temperature was 222° C. An ethylene-based polymer having a melt index (I2) of 1.7 g/10 min was obtained. Approximately 80 grams of ethylene based polymer was collected (B–1). The amount of asymmetrical diene was increased two-fold to form two more inventive polymers (B-2 and B-3). Reaction polymerization conditions are summarized below in Table 4. Some polymer properties are shown in Table 5 below.

TABLE 4

Polymerization Conditions

|  | Ethylene (g/hr) | Propion-aldehyde (g/hr) | t-butyl peroxy-acetate (g/hr) | DCPOEM (g/hr) | Reaction Temperature (° C.) | Ethylene Conversion (wt %) | Ethylene-Based Polymer Collected (g) |
|---|---|---|---|---|---|---|---|
| B-0 | 1000 | 3.23 | 0.0019 | 0 | 219° C. | 11 | 50 |
| B-1 | 1000 | 3.23 | 0.0022 | 0.29 | 222° C. | 12 | 80 |
| B-2 | 1000 | 3.23 | 0.0026 | 0.68 | 210° C. | 11 | 60 |
| B-3 | 1000 | 3.23 | 0.0032 | 1.0 | 208° C. | 11 | 60 |

TABLE 5

Polymer Properties

|  | Melt Index (I2) | Melt Strength (cN) |
|---|---|---|
| B-0 | 1.7 | 10 |
| B-1 | 1.7 | 13.2 |
| B-2 | 0.98 | 15 |
| B-3 | 0.97 | 15.7 |

As shown in Table 5, the inventive polymers (B-1, B-2 and B-3) have significantly higher melt strength than the comparative control (B-0).

Other Asymmetrical Dienes

Additional dienes, as shown in Table 6, were examined.

TABLE 6

Other Asymmetrical Dienes

| Name | CAS # | Chemical Structure |
|---|---|---|
| Citronellyl Methacrylate | 38582-32-0 |  |
| Geranyl Methacrylate | 31467-34-2 |  |
| Oleyl Methacrylate | 13533-08-9 |  |
| Dicyclopentenyl Methacrylate | 31621-69-9 |  |
| 3-(Acryloyloxy)-2-hydroxypropyl methacrylate | 1709-71-3 |  |

A procedure for the synthesis of the first three asymmetrical dienes, shown in Table 6, from the corresponding alcohols is found in U.S. Pat. No. 4,916,255. The asymmetrical dicyclopentenyl methacrylate is commercially available from Sartomer Company. The asymmetrical diene 3-(acryloyloxy)-2-hydroxypropyl methacrylate is commercially available from Aldrich Chemical Company.

Representative Polymerization Using an Asymmetrical Diene from Table 6.

Asymmetrical Diene—

Undiluted asymmetrical diene was loaded into a 0.25 L glass supply vessel, which was open to the atmosphere. Sufficient ethyl acetate was added to produce a "10 to 20 wt %" solution of the asymmetrical diene in ethyl acetate, with the exception of oleyl methacrylate, which was used undiluted.

CTA—

A fresh "250 mL" bottle of undiluted propionaldehyde (97%) was used as a supply vessel, which was open to the atmosphere.

Initiator—

The peroxide initiator, tert-butyl peroxyacetate (2.3 grams of a 50% by weight solution in isododecane) was combined with 500 mL of n-heptane, and loaded into a third glass supply vessel. This solution was purged with nitrogen to minimize dissolved oxygen.

Representative Polymerization of an Inventive Ethylene-Based Polymer

Asymmetrical diene solution, or neat oleyl methacrylate, was pumped at a pressure of 250 bar, through an HPLC degasser, and then into the propionaldehyde stream, and mixed before said mixture was added to the ethylene stream, and compressed to 2000 bar. The rate of asymmetrical diene addition is given in Table 7 below. The peroxide initiator was added to the "ethylene-propionaldehyde-asymmetrical diene" mixture, before the mixture entered the reactor at a pressure of 2000 bar, and at a rate sufficient to achieve a reactor temperature of 200° C. to 220° C. The ethylene conversion to polymer was 9 to 12 wt % based on the mass of ethylene entering the reactor. An ethylene-based polymer having a melt index (I2) of from 1 to 5 g/10 min was obtained. Approximately 50 to 100 grams of ethylene based polymer was collected in each case.

For each asymmetrical diene, a control experiment with no diene was also conducted. Some polymer properties are shown in Table 7 below. In each case, the polymer sample prepared with the asymmetrical diene had a higher melt strength than the control, with each having approximately the same melt index.

TABLE 7

Polymer Properties

| Asymmetrical Diene Name | Polymer Designation | Asymmetrical Diene (gm/hr) | Melt Index (I2) | Melt Strength (cN) |
|---|---|---|---|---|
| Control | C-0 | 0 | 4 | 5.3 |
| Citronellyl Methacrylate | C-1 | 1.6 | 4 | 9.5 |
| Control | D-0 | 0 | 3.3 | 6.1 |
| Geranyl Methacrylate | D-1 | 1.6 | 3 | 11.2 |
| Control | E-0 | 0 | 1.5 | 9.1 |
| Oleyl Methacrylate | E-1 | 2.36 | 1.3 | 12.3 |
| Control | F-0 | 0 | 1.5 | 9.1 |
| Dicyclopentenyl Methacrylate | F-1 | 0.52 | 1.3 | 15.1 |
| Control | G-0 | 0 | 1.3 | 11.4 |
| 3-(Acryloyloxy)-2-hydroxypropyl methacrylate | G-1 | 0.23 | 1.0 | 15.5 |

The invention claimed is:

1. An ethylene-based polymer formed from reacting at least the following: ethylene and at least one asymmetrical polyene, comprising an "alpha, beta unsaturated end" and a "C—C double bond end," and wherein the reaction takes place in the presence of at least one free-radical initiator; wherein the ethylene-based polymer comprises ethylene and at least one asymmetrical polyene as the only monomeric units; and
wherein the ethylene-based polymer comprises, in reacted form, less than, or equal to, 10 moles asymmetrical polyene per 1000 moles of ethylene-based polymer back bone carbons, based on the weight of the polymer; and the polymer comprises structure A:

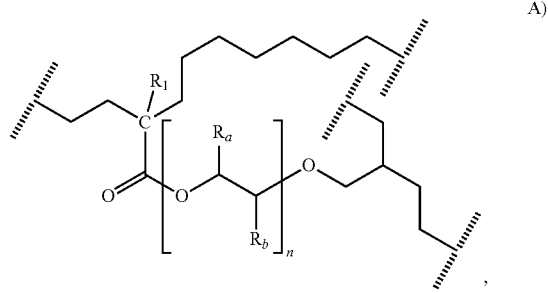

wherein n is from 1 to 50; $R_1$ is selected from H or $C_1$-$C_6$ alkyl; $R_a$ is selected from H or methyl; $R_b$ is selected from H or methyl; and when $R_a$ is methyl, then $R_b$ is hydrogen; and when $R_a$ hydrogen, then $R_b$ is methyl.

2. The ethylene-based polymer of claim 1, wherein, in the reaction, the asymmetrical polyene is present in an amount greater than, or equal to, 100 ppm, based on the total amount of ethylene.

3. The ethylene-based polymer of claim 1, wherein the ethylene-based polymer is a low density polyethylene (LDPE).

4. A composition comprising the ethylene-based polymer of any of claim 1.

5. The composition of claim 4, further comprising at least one other polymer.

6. An article comprising at least one component formed from the composition of claim 4.

7. A process to form the ethylene-based polymer of claim 1, said process comprising polymerizing ethylene in the presence of the asymmetrical polyene.

8. The process of claim 7, wherein the polymerization takes place in a reactor configuration comprising at least one tubular reactor.

9. An ethylene-based polymer having the structure A:

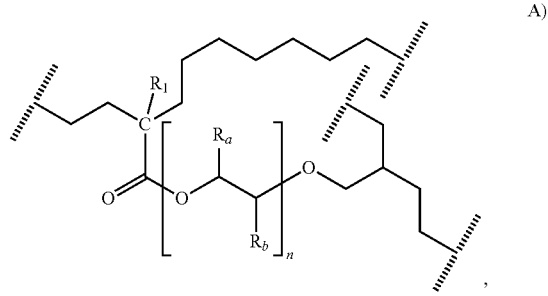

wherein n is from 1 to 50; $R_1$ is selected from H or $C_1$-$C_6$ alkyl; $R_a$ is selected from H or methyl; $R_b$ is selected from H or methyl; and when $R_a$ is methyl, then $R_b$ is hydrogen; and when $R_a$ hydrogen, then $R_b$ is methyl, wherein ethylene and at least one asymmetrical polyene are the only monomeric units.

10. An ethylene-based polymer having the structure A:

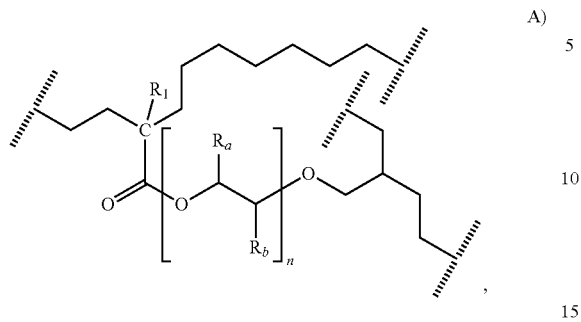

wherein n is from 1 to 50; $R_1$ is selected from H or $C_1$-$C_6$ alkyl; $R_a$ is selected from H or methyl; $R_b$ is selected from H or methyl; and when $R_a$ is methyl, then $R_b$ is hydrogen; and when $R_a$ hydrogen, then $R_b$ is methyl, wherein ethylene and at least one asymmetrical polyene are the only monomeric units, and wherein the ethylene-based polymer comprises, in reacted form, less than or equal to 10 moles asymmetrical polyene per 1000 moles of ethylene-based polymer backbone carbons, based on the weight of the polymer.

11. The ethylene-based polymer of claim 9 wherein the ethylene-based polymer is a low density polyethylene.

* * * * *